M. F. MITCHEL.
Churn-Dasher.
No. 208,533. Patented Oct. 1, 1878.
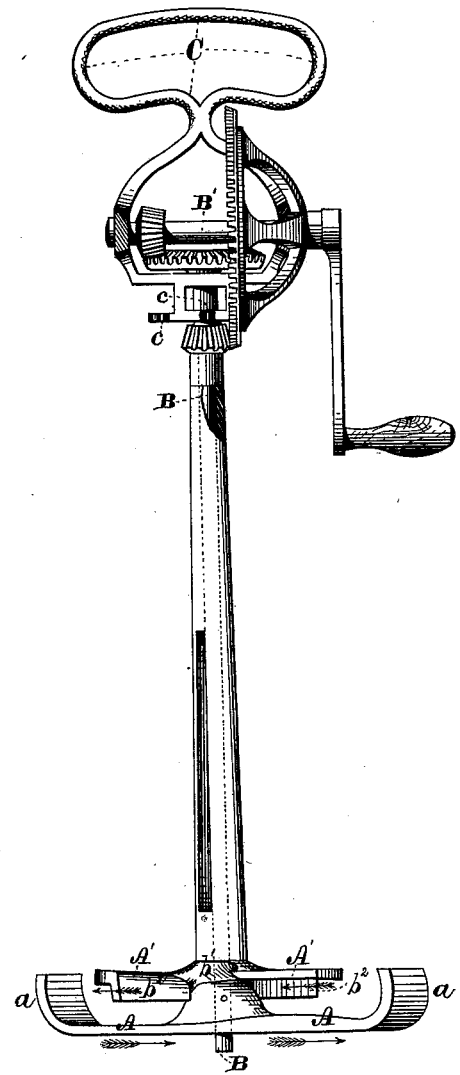
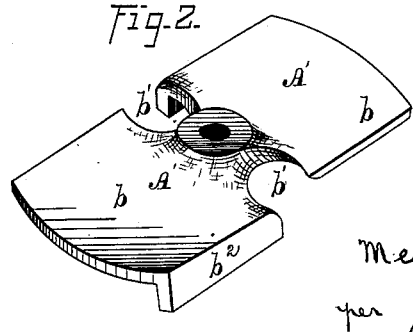

UNITED STATES PATENT OFFICE.

MERIT F. MITCHEL, OF RIPON, WISCONSIN.

IMPROVEMENT IN CHURN-DASHERS.

Specification forming part of Letters Patent No. 208,533, dated October 1, 1878; application filed March 16, 1878.

*To all whom it may concern:*

Be it known that I, MERIT F. MITCHEL, of Ripon, in the county of Fond du Lac and State of Wisconsin, have made certain new and useful Improvements in Churn-Dashers; and I do hereby declare that the following is a full, clear, and exact description thereof, which will enable others skilled in the art to which it appertains to make and use the same, reference being had to the accompanying drawings, and to the letters of reference marked thereon, which form a part of this specification, and in which—

Figure 1 is a side elevation of my improved churn-dasher, and Fig. 2 is a perspective view of the upper beater removed.

Corresponding parts in the two figures are denoted by like letters.

This invention appertains to certain improvements in that class of churn-dashers in which two oppositely-revolving dashers or beaters are associated together and driven, one at a greater speed than the other, upon concentric shafts; and it consists, primarily, in providing the upper beater or dasher with downwardly-projecting flanges, and combining it with a second beater or dasher, substantially as hereinafter more fully set forth.

In the annexed drawing, A A' refer to two oppositely-revolving dashers or beaters, driven, the upper one at a greater speed than the lower one, and attached to the concentric shafts B B', to which motion is imparted by suitable gearing, as shown, or otherwise.

The lower beater or dasher is pinned or secured to its shaft a short distance from the lower end of said shaft, to slightly elevate the dasher above the bottom of the inclosing-receptacle to free it from contact with the receptacle. This dasher is provided with upwardly-projecting flanges $a\ a$, which are arranged obliquely, and which, with the aid of the movement of the said dasher, prevent the revolving of the liquid in the direction of the oppositely-moving dasher A', and throw it upon said dasher toward its center.

The upper dasher, A', is provided with wings $b\ b$, between which are spiral apertures or openings $b^1\ b^1$, and which wings are provided with downwardly-projecting flanges $b^2\ b^2$, arranged diagonally to each other.

Unlike all other churn-dashers, my dashers strike the cream or liquid edgewise, and thereby render the labor of churning easier and bring less pressure upon the beaters.

It will be further observed that by this arrangement my invention can be used in a shallow body of liquid, and also as an egg-whipper.

Attached to one of the shafts of the dashers is a metallic handle or frame, C, adapted to receive the left hand of the operator, to permit of the use of the device without attachment to the receptacle containing the cream or liquid to be operated on. If, however, it becomes necessary, from the nature of work, to secure the dasher-shafts in a fixed position, provision is made for that purpose by providing the lower portion of the frame C with perforated arms $c\ c$, through which fastenings may be inserted, entering the cover of the inclosing-receptacle.

Having thus described my invention, what I claim, and desire to secure by Letters Patent, is—

1. The combination of the dasher or beater A with the dasher or beater A', provided with downwardly-projecting flanges $b^2\ b^2$, arranged upon concentric shafts driven by suitable mechanism, substantially as and for the purpose set forth.

2. The combination of the dasher or beater A', having the downwardly-projecting flanges $b^2\ b^2$, with the dasher or beater A, provided with the upwardly-projecting flanges $a\ a$, arranged upon concentric shafts operated by suitable mechanism, substantially as and for the purpose set forth.

3. The combination of the dasher or beater A, having the upwardly-projecting flanges $a\ a$, with the dasher or beater A', provided with downwardly-projecting flanges $b^2\ b^2$ and openings or apertures $b^1\ b^1$, arranged upon concentric shafts operated by suitable mechanism, substantially as and for the purpose set forth.

In testimony that I claim the foregoing as my own I hereunto affix my signature in the presence of two witnesses.

MERIT F. MITCHEL.

Witnesses:
 THOS. HARRIS.
 C. H. MILLIMAN.